United States Patent
Larson et al.

(10) Patent No.: US 8,033,197 B2
(45) Date of Patent: Oct. 11, 2011

(54) FULLY FLOATING, SELF-ALIGNING, SELF-ADJUSTING GIMBAL ASSEMBLY FOR AN ACTIVE HUMAN MACHINE INTERFACE

(75) Inventors: Keith D. Larson, Petoskey, MI (US); Joseph M. Walling, Boyne City, MI (US)

(73) Assignee: Honeywell International Inc., Morristown, NJ (US)

( * ) Notice: Subject to any disclaimer, the term of this patent is extended or adjusted under 35 U.S.C. 154(b) by 1030 days.

(21) Appl. No.: 11/872,571

(22) Filed: Oct. 15, 2007

(65) Prior Publication Data

US 2008/0115611 A1  May 22, 2008

Related U.S. Application Data

(60) Provisional application No. 60/860,609, filed on Nov. 20, 2006.

(51) Int. Cl.
*B64C 13/04* (2006.01)
*F16C 25/08* (2006.01)
*G05G 9/047* (2006.01)

(52) U.S. Cl. .................................. 74/471 XY; 384/517
(58) Field of Classification Search ............ 74/471 XY, 74/473.33; 384/517, 518
See application file for complete search history.

(56) References Cited

U.S. PATENT DOCUMENTS

| | | | |
|---|---|---|---|
| 3,365,975 A | 1/1968 | Hathaway |
| 3,776,058 A | 12/1973 | French |
| 3,870,161 A | 3/1975 | Cording |
| 4,492,018 A | 1/1985 | Rode |
| 4,818,124 A | 4/1989 | Brandenstein et al. |
| 4,857,881 A | 8/1989 | Hayes |
| 5,243,873 A | 9/1993 | Demers |
| 5,619,195 A | 4/1997 | Allen et al. |
| 6,002,351 A | 12/1999 | Takeda et al. |
| 6,064,369 A | 5/2000 | Okabe et al. |
| 6,353,430 B2 | 3/2002 | Cheng et al. |
| 6,462,731 B1 | 10/2002 | Stoffers et al. |
| 6,536,298 B1 | 3/2003 | Bellur et al. |
| 6,647,820 B2 | 11/2003 | McKeown et al. |
| 6,654,005 B2 | 11/2003 | Wang |
| 6,892,597 B2 | 5/2005 | Tews |

FOREIGN PATENT DOCUMENTS

EP  0352417 A2  1/1990

*Primary Examiner* — William C Joyce
(74) *Attorney, Agent, or Firm* — Ingrassia Fisher & Lorenz, P.C.

(57) ABSTRACT

A human-machine interface assembly is implemented with a gimbal assembly that includes a roll hub, a pitch hub, and a main hub. The gimbal assembly further includes a plurality of bearings, and is mounted via a plurality of bearing sets, that are each disposed in a free floating manner. As a result, each of the bearings is self-aligning and self-adjusting when the gimbal assembly is assembled and mounted. The gimbal assembly additionally includes a plurality of integral stops that mechanically limit movement of a user interface to predetermined pitch and roll angles.

16 Claims, 13 Drawing Sheets

FULLY FLOATING, SELF-ALIGNING, SELF-ADJUSTING GIMBAL ASSEMBLY FOR AN ACTIVE HUMAN MACHINE INTERFACE

CROSS-REFERENCES TO RELATED APPLICATIONS

This application claims the benefit of U.S. Provisional Application No. 60/860,609, filed Nov. 20, 2006.

TECHNICAL FIELD

The present invention relates to human-machine interfaces and, more particularly, to a gimbal assembly for human-machine interface system having a fully floating, self-aligning, and self-adjusting configuration.

BACKGROUND

Human-machine interfaces that are used to translate human movements to machine movements are used in myriad industries. For example, some aircraft flight control systems include a human-machine interface in the form of one or more control sticks. The flight control system, in response to input forces supplied to the control stick from the pilot, controls the movements of various aircraft flight control surfaces. No matter the particular end-use system, the human-machine interface preferably includes some type of haptic feedback mechanism back through the interface to the interface operator. The interface also typically includes one or more devices for accurately converting angular displacements into rotary motion.

In many instances, the devices that are used to convert angular displacements to rotary motion are relatively complex, relatively large, relatively heavy, and relatively costly. Hence, there is a need for a device that converts angular displacements to rotary motion that is relatively simple, relatively small, relatively light-weight, and relatively inexpensive. The present invention addresses at least this need.

BRIEF SUMMARY

In one embodiment, and by way of example only, a gimbal assembly includes a roll hub, a pitch hub, a plurality of pitch hub bearings, and a plurality of pitch hub bearing springs. The roll hub is configured to rotate about a first rotational axis, and the pitch hub is disposed at least partially within the roll hub. The plurality of pitch hub bearings is disposed between the roll hub and the pitch hub to allow the pitch hub to rotate relative to the roll hub about a second rotational axis that is perpendicular to the first rotational axis. Each of the pitch hub bearing springs supplies a bias force to a pitch hub bearing that pre-loads that pitch hub bearing axially inwardly toward a section of the pitch hub, whereby the pitch hub bearings are fully-floating, self-aligning, and self-adjusting.

In another exemplary embodiment, a gimbal assembly includes a user interface, a roll hub, a pitch hub, a plurality of pitch hub bearings, a plurality of pitch hub bearing springs, a main hub, a main pitch shaft, integral roll stop surfaces, and integral pitch stop surfaces. The roll hub is configured to rotate, from a null position to a plurality of control positions, about a first rotational axis. The pitch hub is disposed at least partially within the roll hub and is coupled to the user interface. Each of the plurality of pitch hub bearings is disposed between the roll hub and the pitch hub to allow the pitch hub to rotate relative to the roll hub, from the null position to a plurality of control positions, about a second rotational axis that is perpendicular to the first rotational axis. Each of the plurality of pitch hub bearing springs supplies a bias force to a pitch hub bearing that pre-loads that pitch hub bearing axially inwardly toward a section of the pitch hub, whereby the pitch hub bearings are fully-floating, self-aligning, and self-adjusting. The main hub is disposed at least partially within, and is coupled to, the pitch hub. The main pitch shaft is coupled to, and extends through, the main hub along the second rotational axis. The integral roll stop surfaces are formed on the main pitch shaft and engage the main hub when the main hub is rotated about the first axis a predetermined angle relative to the null position, to thereby limit rotation of the main hub about the first rotational axis. The integral pitch stop surfaces are formed on the roll hub and engage the user interface when, in response to a force supplied to the user interface, the pitch hub and user interface are rotated about the second axis a predetermined pitch angle relative to the null position, to thereby limit rotation of the roll hub about the second rotational axis.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

Figure 1:
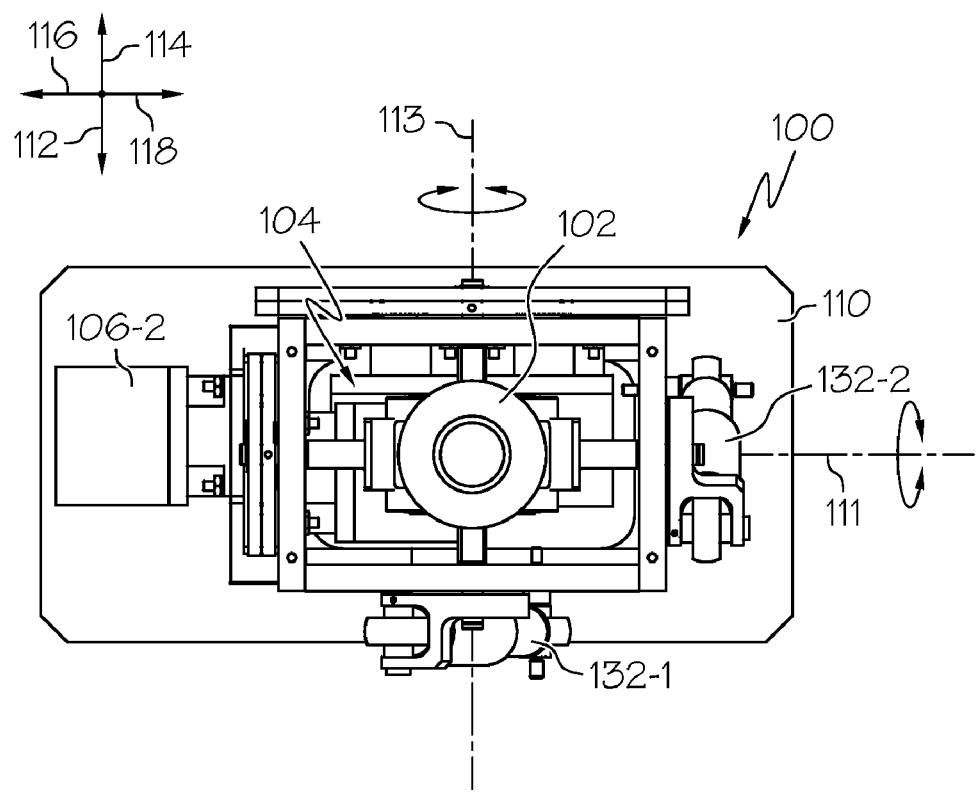
FIGS. 1-6 are top, bottom, front end, back end, left side, and right side views of an active human-machine interface assembly in accordance with an exemplary embodiment of the present invention.
Figure 2:
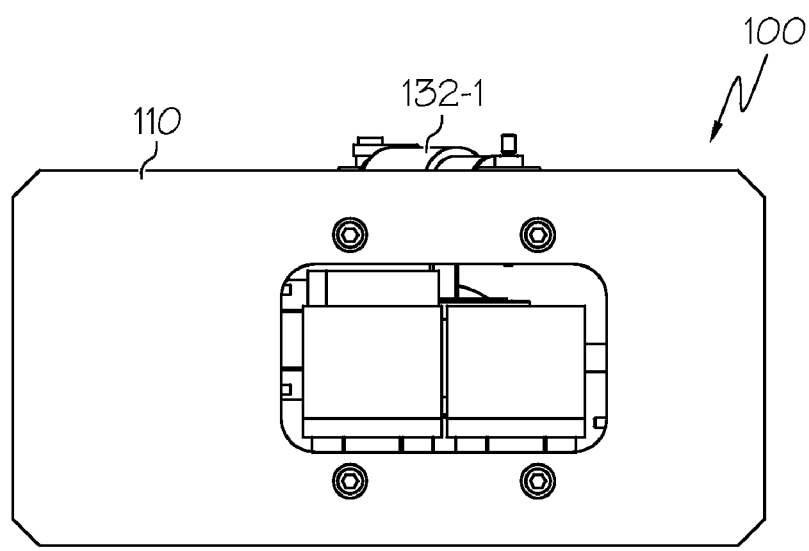
Figure 3:
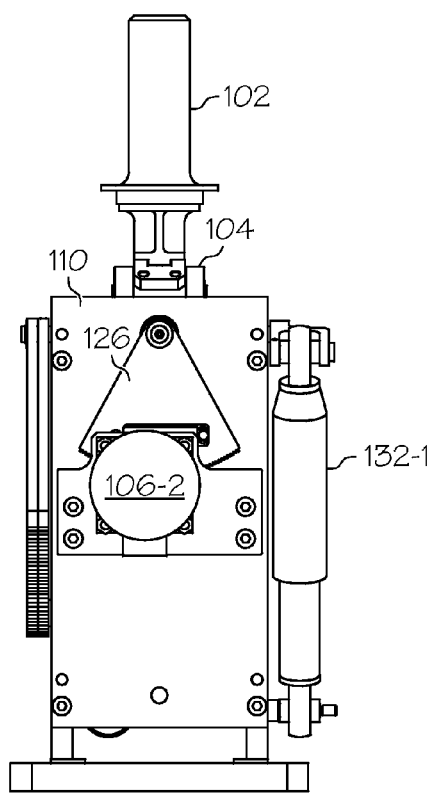
Figure 4:
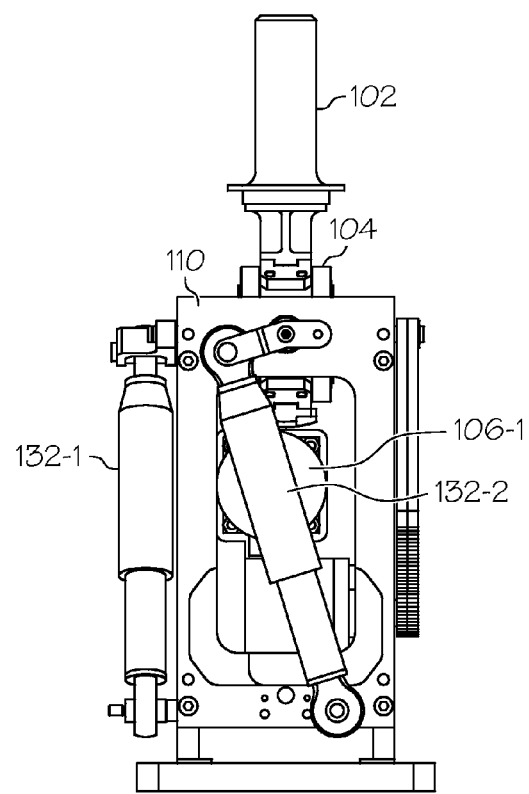
Figure 5:
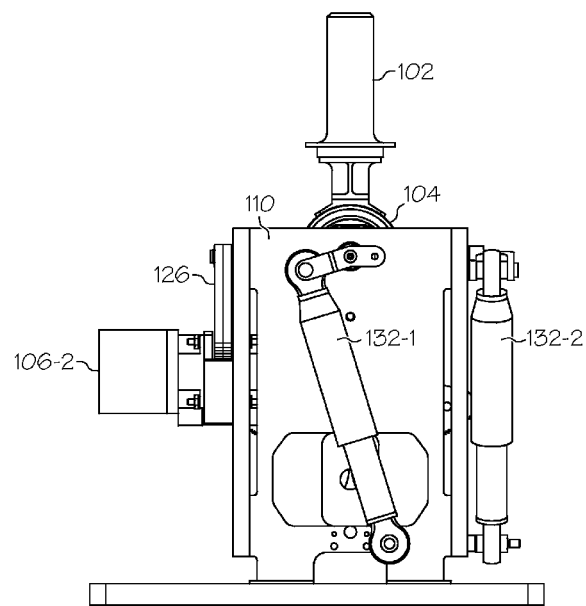
Figure 6:
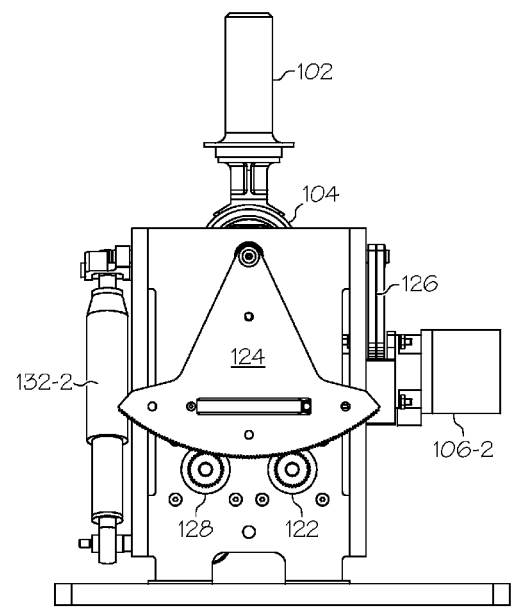
Figure 7:
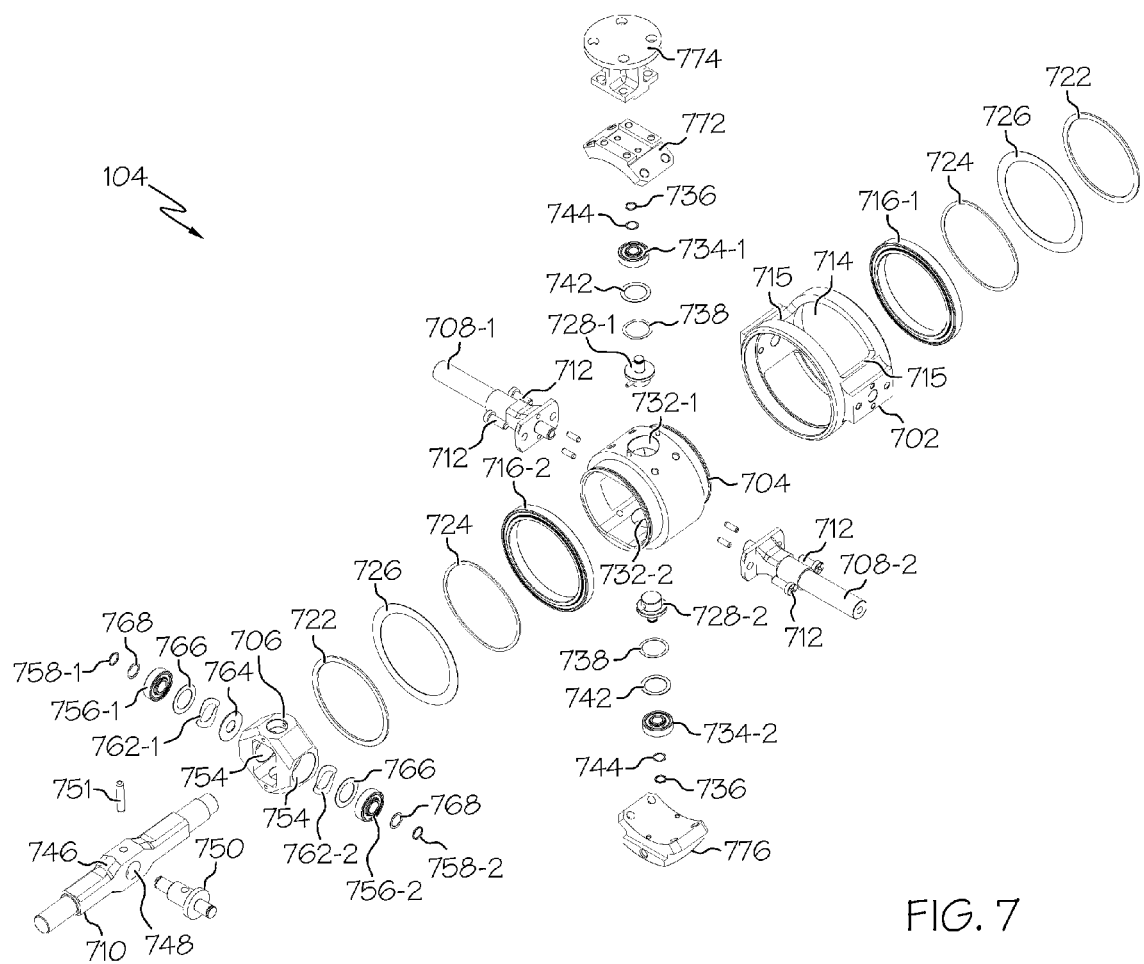
FIG. 7 is an exploded isometric view of an exemplary embodiment of a gimbal assembly that may be used to implement the active human-machine interface of FIGS. 1-6.
Figure 8:
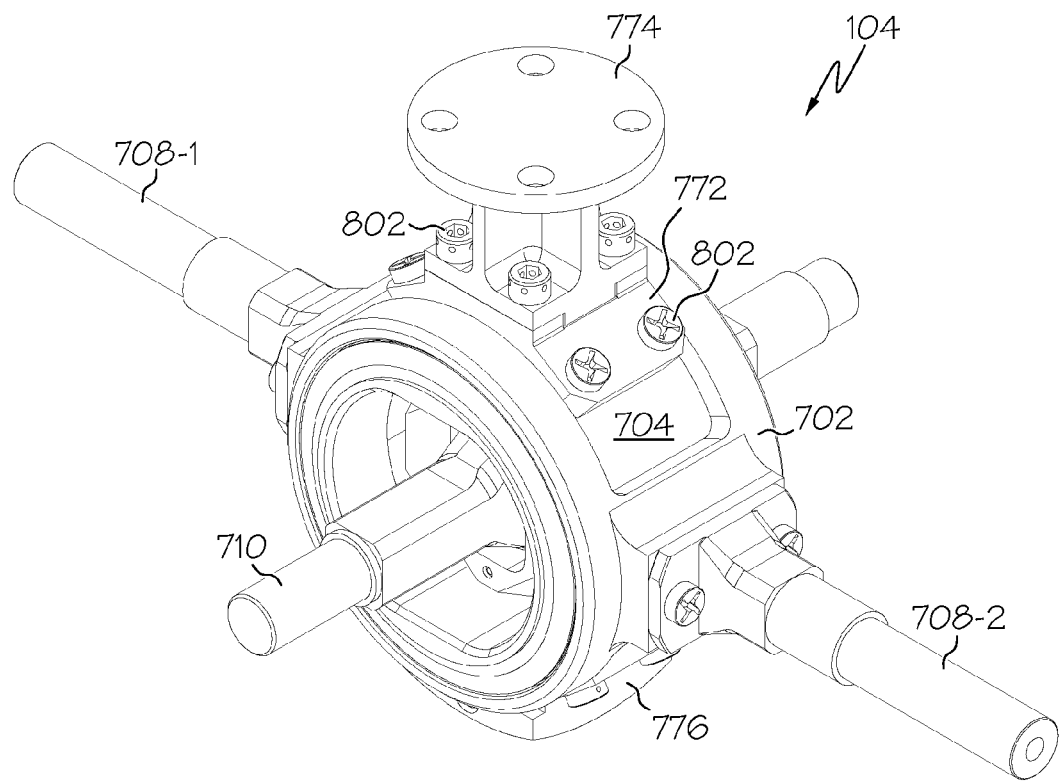
FIG. 8 is an isometric views of the gimbal assembly of FIG. 7.
Figure 9:
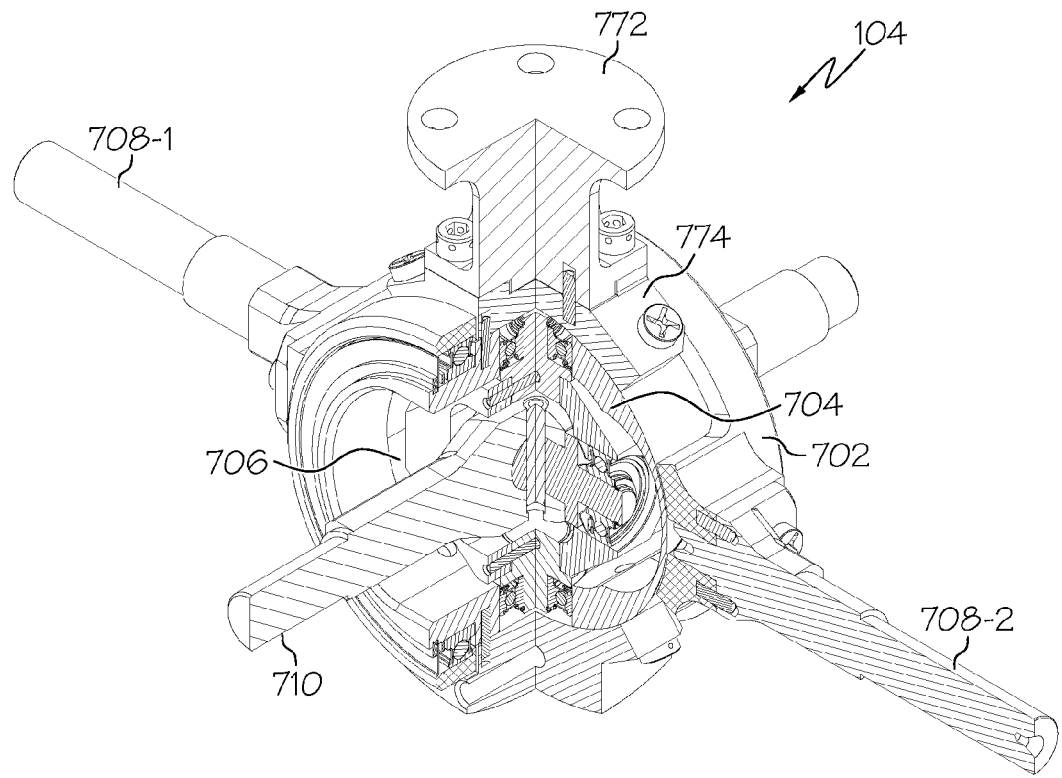
FIG. 9 is a partial cross section view of the exemplary gimbal assembly depicted in FIG. 8.
Figure 10:
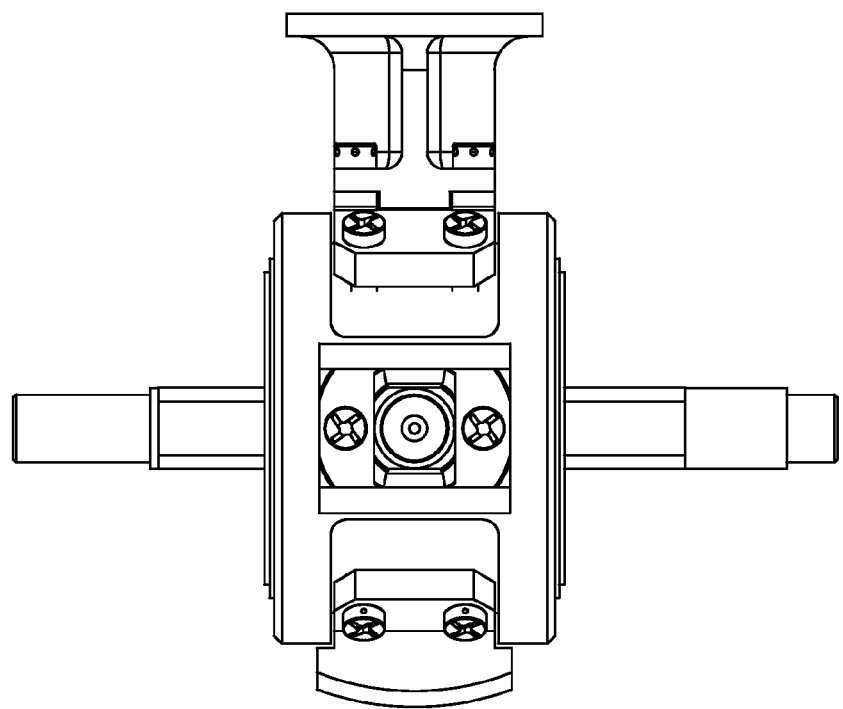
FIGS. 10 and 11 are end and side views, respectively, of the gimbal assembly depicted in FIGS. 7-9.

The following detailed description is merely exemplary in nature and is not intended to limit the invention or the application and uses of the invention. Furthermore, there is no intention to be bound by any theory presented in the preceding background or the following detailed description. In this regard, although the following description is, for convenience, directed to a gimbal assembly implemented with a user interface that is configured as a control stick, it will be appreciated that the system could be implemented with variously configured user interfaces including, for example, variously configured pedals, yokes, levers, and the like. It will additionally be appreciated that the gimbal assembly may be used in any one of numerous applications, such as gyroscopes, that require two degrees of freedom.

An exemplary embodiment of an active human-machine interface control unit 100 is depicted in FIGS. 1-6, and includes a user interface 102, a gimbal assembly 104, and a plurality of motors 106. The user interface 102 is coupled to the gimbal assembly 104 and is configured to receive an input force from a user. The user interface 102 may be implemented according to any one of numerous configurations. In the depicted embodiment, however, it is implemented as a control stick that is preferably dimensioned to be grasped by a hand.

The gimbal assembly 104 is mounted within a housing assembly 110 and is configured to allow the user interface 102 to be moved from a null position 109, which is the position depicted in FIGS. 1-6, to a plurality of control positions in a plurality of directions. More specifically, the gimbal assembly 104, in response to an input force supplied to the user interface 102, allows the user interface 102 to be moved from the null position 109 to a plurality of control positions, about two perpendicular rotational axes—a first rotational axis 111 and a second rotational axis 113. It will be appreciated that if the active human-machine interface control unit 100 is implemented as an aircraft flight control human-machine interface, such as a pilot (or co-pilot) inceptor, then the first and second rotational axes 111, 113 may be referred to as the roll axis and the pitch axis, respectively.

No matter its specific end use, the gimbal assembly 104 allows the user interface 102 to be movable about the first rotational axis 111 in a port direction 112 and a starboard direction 114, and about the second axis 113 in a forward direction 116 and an aft direction 118. It will additionally be appreciated that the gimbal assembly 104 is configured to allow the user interface 102 to be simultaneously rotated about the first and second rotational axes 111, 113 to move the user interface 102 in a combined forward-port direction, a combined forward-starboard direction, a combined aft-port direction, or a combined aft-starboard direction, and back to or through the null position 109. A more detailed description of particular preferred embodiments of the gimbal assembly 104 will be provided further below. Before doing so, however, the remainder of active human-machine interface control unit 100 will be briefly described.

The motors 106, which in the depicted embodiment include a first motor 106-1 and a second motor 106-2, are also mounted on the housing assembly 110 and are used to supply force feedback to the user interface 102. The motors 106 may be implemented using any one of numerous types of motors, but in the depicted embodiment are cogless brushless motors. The first motor 106-1 is controllably energized to supply force feedback to the user interface 102 in opposition to user interface displacements having a vector component in either the forward or backward direction 116, 118, and the second motor 106-2 is controllably energized to supply force feedback to the user interface 102 in opposition to user interface displacements having a vector component in either the port or starboard direction 112, 114. The motors 106 are controllably energized from feedback control circuits (not depicted in FIGS. 1-6) that receive user interface movement signals from one or more non-illustrated user interface sensors and, in response to at least these user interface movement signals, controllably energize the motors 106 to supply the appropriate force feedback to the user interface 102. It will be appreciated that the user interface sensors may be implemented using position and/or force sensors.

Preferably, and as FIGS. 1-6 additionally depict, the motors 106 are each coupled to the user interface 102 via one or more gears and the gimbal assembly 104. More specifically, the first motor 106-1 includes a splined output shaft 122 that meshes with one or more first sector gears 124 (see FIG. 6). The one or more first sector gears 124 are in turn coupled to the gimbal assembly 104. Similarly, although not visible in FIGS. 1-6, the second motor 106-1 includes a splined output shaft that meshes with one or more second sector gears 126. The one or more second sector gears 126 are also coupled to the gimbal assembly 104. The one or more first and one or more second sector gears 124, 126 are each configured to supply the appropriate, and preferably equivalent, gear reduction between the respective motors 106-1, 106-2 and the user interface 102. In the depicted embodiment, an anti-backlash gear 128 is also included with each sector gear 124, 126 (only one depicted in FIG. 6), though in various other embodiments the anti-backlash gear 128 is not included.

Before proceeding further, it is noted that the control unit 100, at least in the depicted embodiment, further includes a plurality of electrically controllable dampers 132. The electrically controllable dampers 132, which in the depicted embodiment include a first damper 132-1 and a second damper 132-2, are mounted on the housing assembly 110 and are used to selectively supply force feedback to the user interface 102. The dampers 132 are also each coupled to the user interface 102 via the gimbal assembly 104, with the first damper 132-1 configured to selectively supply force feedback to the user interface 102 in opposition to user interface displacements having a vector component in either the forward or backward direction 116, 118, and the second damper 132-2 is configured to selectively supply force feedback to the user interface 102 in opposition to user interface displacements having a vector component in either the port or starboard direction 112, 114. The dampers 132 may be constructed in accordance with any one of numerous configurations now known or developed in the future. A description of the dampers 132 is not needed to fully enable or describe the invention, and will thus not be provided.

Figure 22:
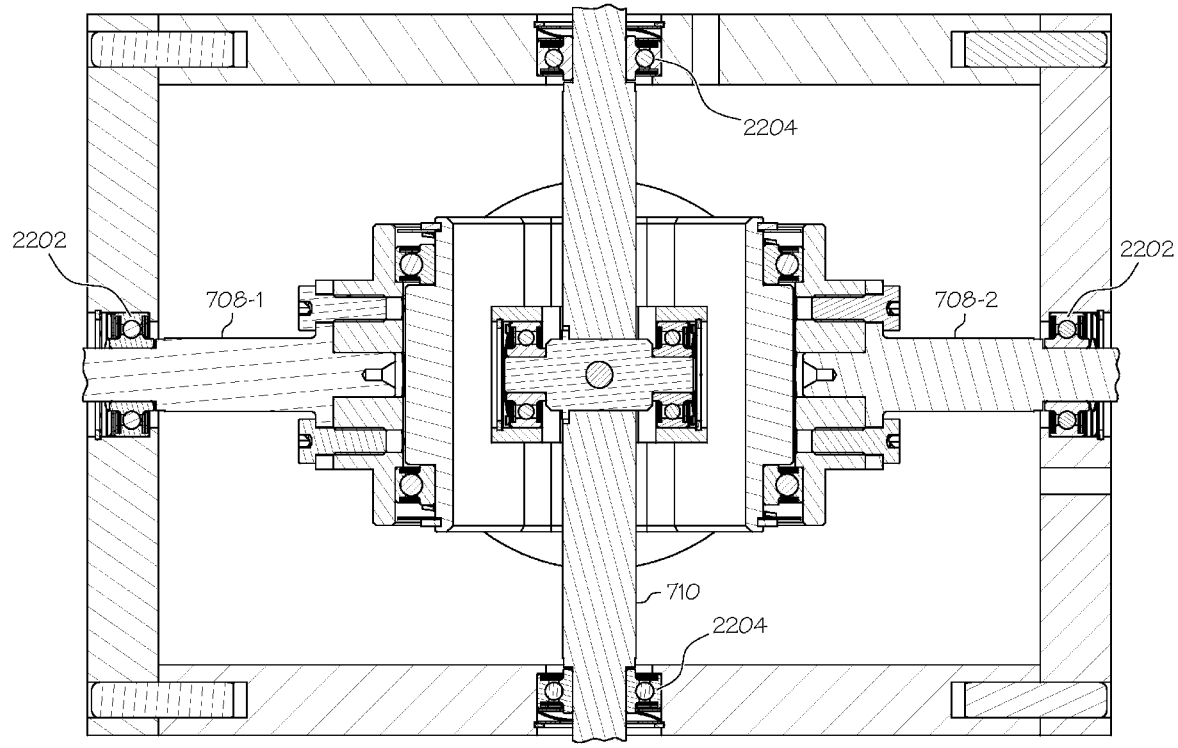
FIG. 22 is a cross section view of the gimbal assembly mounted in a housing.

Turning to FIGS. 7-11, a more detailed description of the gimbal assembly 104 will now be provided. The gimbal assembly 104, as noted above, is configured to allow the user interface 102 to be moved, from the null position 109 to a plurality of control positions, about the first rotational axis 111 and the second rotational axis 113. To do so, at least in the depicted embodiment, the gimbal assembly includes a roll hub 702, a pitch hub 704, a main hub 706, a first main roll shaft 708-1, a second main roll shaft 708-2, and a main pitch shaft 710. The roll hub 702 is configured to rotate about the first rotational axis 111 via the first and second main roll shafts 708-1, 708-2. More specifically, and as depicted more clearly in FIG. 22, the main roll shafts 708 are each rotationally mounted to the housing assembly 110 via a set of main roll shaft bearings 2202. In the depicted embodiment, and with reference once again to FIGS. 7-11, it is seen that the main roll shafts 708 are each coupled to the roll hub 702 via suitable fasteners 712. It will be appreciated, however, that the main roll shafts 708 could be coupled to the roll hub 702 using any one of numerous alternative techniques. For example, the main roll shafts could be welded to the roll hub 702 or formed with the roll hub 702 in a one-piece construction. The roll hub 702 additionally includes a user interface opening 714. The user interface opening 714 allows the user interface 102 to be coupled to the pitch hub 704, in a manner described further below, and additionally defines a plurality of integral pitch stop surfaces 715. As will also be described in more detail further below, the integral pitch stop surfaces 715 limit rotation of the pitch hub 704 and, concomitantly, the user interface 102, about the second rotational axis 113.

Figure 12:
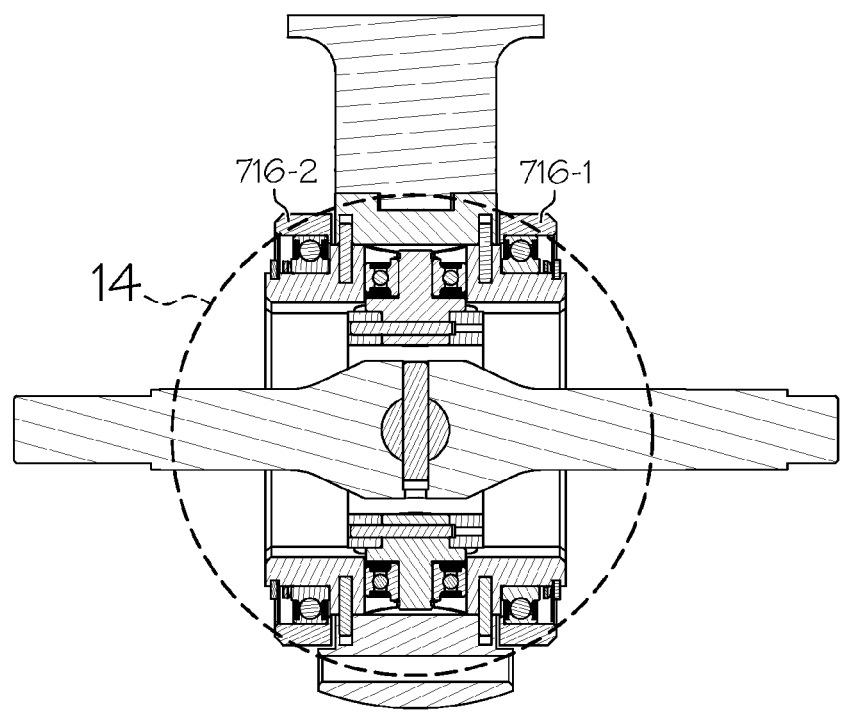
FIG. 12 is a cross section view of the gimbal assembly taken along line 12-12 of FIG. 11.
Figure 11:
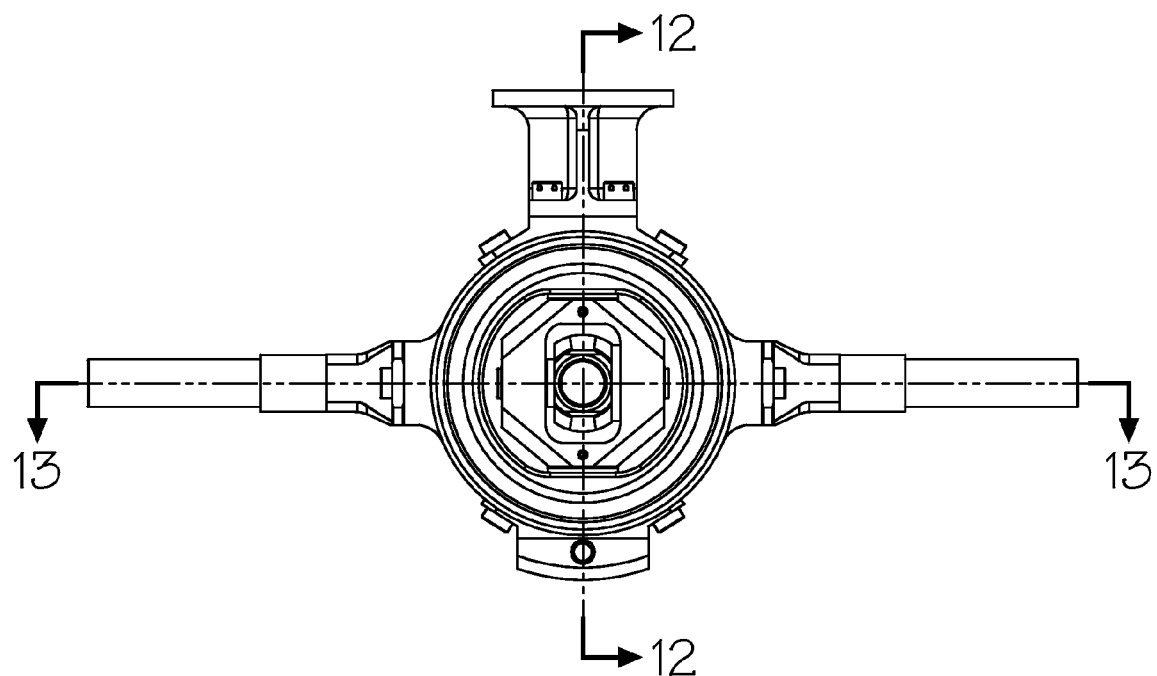
Figure 13:
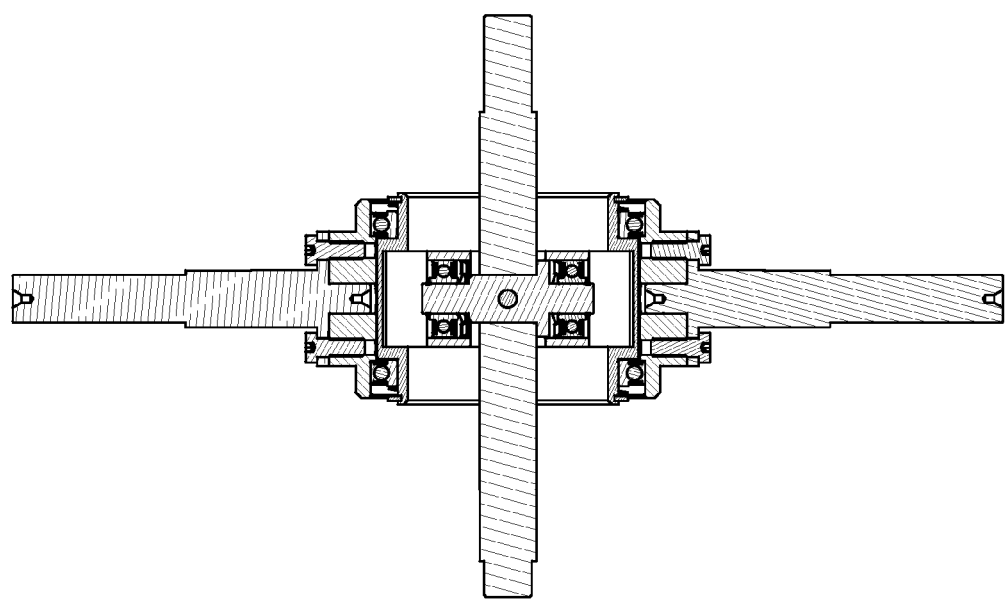
FIG. 13 is a cross section view of the gimbal assembly taken along line 13-13 of FIG. 11.
Figure 14:
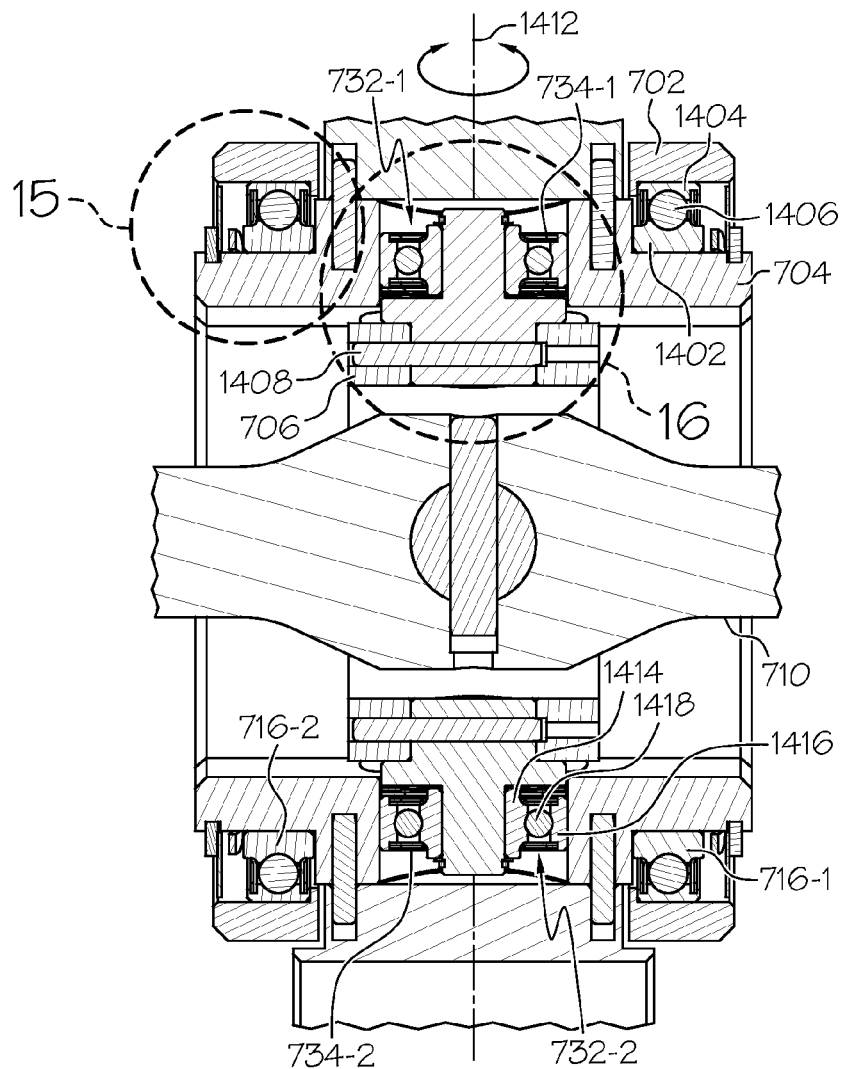
FIG. 14 is a detailed view of the portion of FIG. 12 encircled by 14.

The pitch hub 704 is disposed, at least partially, within the roll hub 702 and is configured to rotate relative to the roll hub 702 about the second rotational axis 113. To implement this relative rotation, the gimbal assembly 104 further includes a plurality of pitch hub bearings 716 (e.g., 716-1, 716-2). The pitch hub bearings 716, as shown most clearly in FIGS. 12 and 14, are each disposed between the roll hub 702 and the pitch hub 704, and include an inner race 1402, an outer race 1404, and a plurality of bearing balls 1406 disposed between the inner and outer races 1402, 1404. The pitch hub bearing inner races 1402 are mounted on the pitch hub 704, and the pitch hub bearing outer races 1404 engage the roll hub 702.

Figure 15:
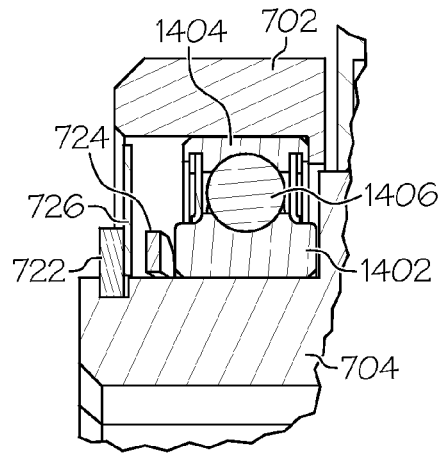
FIG. 15 is a detailed view of the portion of FIG. 14 encircled by 15.

The pitch hub bearings 716 are each retained in position, in a free floating manner, via a pitch hub bearing retaining ring 722 and a pitch hub bearing spring 724. More specifically, as depicted most clearly in FIG. 15, each pitch hub bearing retaining ring 722 is disposed within a groove 1502 formed in the pitch hub 704. The pitch hub bearing springs 724, which in the depicted embodiment are implemented using spring washers, are each disposed between one of the pitch hub bearing retaining rings 722 and one of the pitch hub bearings 716. In the depicted embodiment, only a single pitch hub bearing spring 724 is disposed between each pitch hub bearing 716 and pitch hub bearing retaining ring 722. It will be appreciated, however, that more than one pitch hub bearing spring 724 could be used, if needed or desired. No matter the number of pitch hub bearing springs 724 that are used, each supplies a bias force to one of the pitch hub bearings 716 that pre-loads the pitch hub bearings 716 axially inwardly toward the pitch hub 704, in a free-floating manner. As FIGS. 7 and 15 further depict, one or more suitably sized shims 726 may be disposed between each pitch hub bearing retaining ring 722 and pitch hub bearing spring 724, as needed or desired.

The main hub 706 is disposed, at least partially, within the pitch hub 704, and is additionally coupled to the pitch hub 704. In the depicted embodiment, the main hub 706 is coupled to the pitch hub 704 via a plurality of shafts 728; namely, a first minor pitch shaft 728-1 and a second minor pitch shaft 728-2. As shown most clearly in FIG. 14, the first and second minor pitch shafts 728-1, 728-2 are each coupled to the main hub 706 via, for example, suitable pins 1408. The first and second minor pitch shafts 728-1, 728-2 each extend, in opposite directions along a third rotational axis 1412 that is perpendicular to the first and second rotational axes 111, 113, from the main hub 706 into first and second bearing cavities 732-1, 732-2, respectively, formed in the pitch hub 704. A first minor pitch shaft bearing 734-1 is disposed in the first bearing cavity 732-1, and a second minor pitch shaft bearing 734-2 is disposed in the second bearing cavity 732-2. The first minor pitch shaft bearing 734-1 is mounted on the first minor pitch shaft 728-1, and is disposed between the first minor pitch shaft 728-1 and the pitch hub 704. Similarly, the second minor pitch shaft bearing 734-2 is mounted on the second minor pitch shaft 728-2, and is disposed between the second minor pitch shaft 728-2 and the pitch hub 704. The minor pitch shaft bearings 734 each include an inner race 1414, an outer race 1416, and a plurality of bearing balls 1418 disposed between the inner and outer races 1414, 1416. The minor pitch shaft bearing inner races 1414 are each mounted on one of the minor pitch shafts 728-1, 728-2, and the minor pitch shaft bearing outer races 1416 each engage an inner surface of one of the roll hub bearing cavities 732-1, 732-2. As a result, the first and second minor pitch shafts 728-1, 728-2 may rotate relative to the pitch hub 704 about the third rotational axis 1412.

Figure 16:
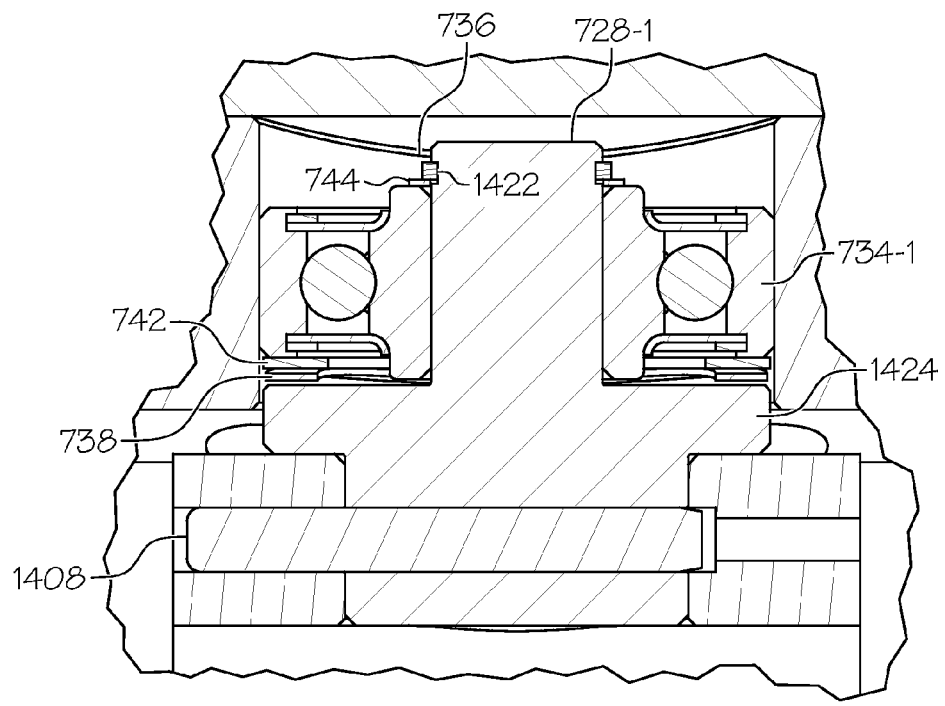
FIG. 16 is a detailed view of the portion of FIG. 14 encircled by 16.

Referring now to FIG. 16, it may be seen that the minor pitch shaft bearings 734, similar to the pitch hub bearings 716, are each retained in position, in a free floating manner, via a minor roll shaft bearing retaining ring 736 and a minor roll shaft bearing spring 738. More specifically, each minor pitch shaft bearing retaining ring 736 is disposed within a groove 1422 formed in each of the minor pitch shafts 728. The minor roll shaft bearing springs 738, which in the depicted embodiment are also implemented using spring washers, are each disposed between an annular spring retaining surface 1424 formed on each minor pitch shaft 728 and one of the minor pitch shaft bearings 734. In the depicted embodiment, only a single minor pitch shaft bearing spring 738 is disposed between each annular spring retaining surface 1424 and minor pitch shaft bearing retaining ring 736. It will be appreciated, however, that more than one minor pitch shaft bearing spring 738 could be used, if needed or desired. No matter the number of minor pitch shaft bearing springs 738 that are used, each supplies a bias force to one of the minor pitch shaft bearings 734 that pre-loads the minor pitch shaft bearings 734 outwardly away from the annular spring retaining surface 1424, in a free-floating manner. As FIGS. 7 and 16 further depict, one or more suitably sized shims 742, 744 may be disposed between each minor pitch shaft bearing spring 738 and each minor pitch shaft bearing 734 and/or each minor pitch shaft retaining ring 736, as needed or desired.

The main pitch shaft 710 extends through the main hub 706, and thus through the pitch hub 704 and the roll hub 702, along the second rotational axis 113. The main pitch shaft 710 includes a plurality of integral roll stop surfaces 746 and a minor roll shaft opening 748. As depicted most clearly in FIG. 22, the main pitch shaft 710 is rotationally mounted to the housing assembly 110 via a set of main pitch shaft bearing assemblies 2204. As such, the main pitch shaft 710 is rotatable about the second rotational axis 113. The integral roll stop surfaces 746 are formed on the main pitch shaft 710 and, as will be described further below, limit rotation of the main hub 706 and, concomitantly, the user interface 102, about the first rotational axis 111. The minor roll shaft opening 748 extends through the main pitch shaft 710 and is configured to receive a minor roll shaft 750.

Figure 17:
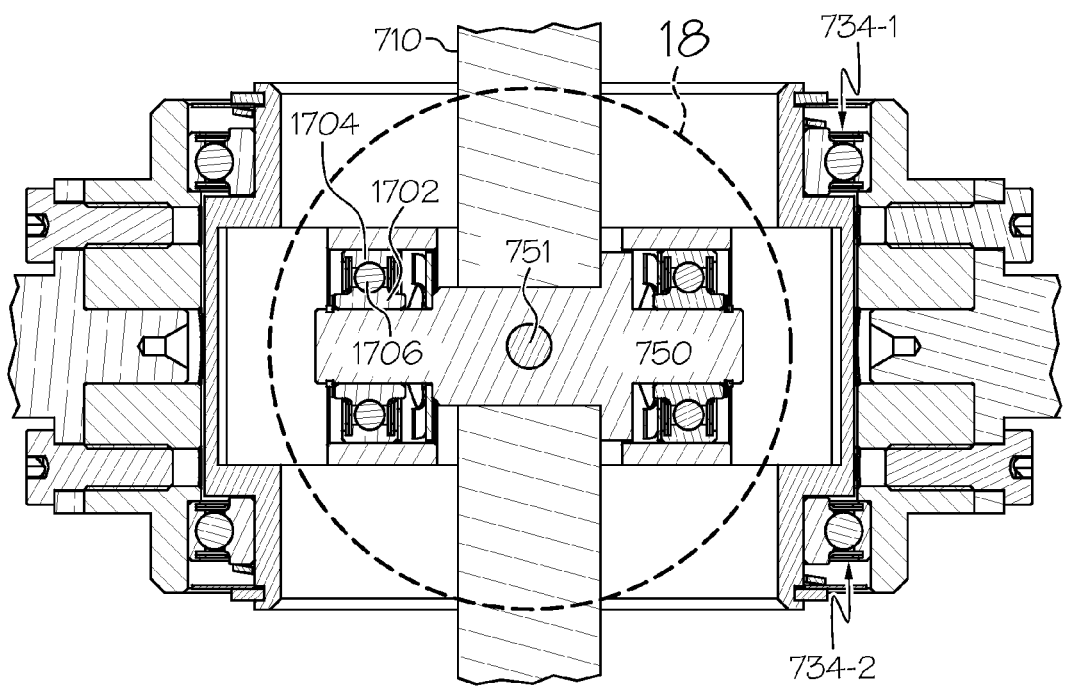
FIG. 17 is a detailed view of the portion of FIG. 13 encircled by 17.

The minor roll shaft 750 extends into and through the minor roll shaft opening 748 along the first rotational axis 111. It may thus be appreciated that the minor roll shaft 750 is disposed perpendicular to the main pitch shaft 710. The minor roll shaft 750 is coupled to the main pitch shaft 710 via, for example, a dowel pin 751, and the ends of the minor roll shaft 750 extend into minor roll shaft bearing cavities 754 formed in the main hub 706. A minor roll shaft bearing 756 (e.g., 756-1, 756-2) is disposed in each minor roll shaft bearing cavity 754. The minor roll shaft bearings 756 are mounted on the minor roll shaft 750, and are disposed between the minor roll shaft 750 and the main hub 706. As shown most clearly in FIG. 17, the minor roll shaft bearings 756, like each of the previously-described bearings, include an inner race 1702, an outer race 1704, and a plurality of bearing balls 1706 disposed between the inner and outer races 1702, 1704. The minor roll shaft bearing inner races 1702 are each mounted on the minor roll shaft 750, and the minor roll shaft bearing outer races 1704 each engage an inner surface of one of the minor roll shaft bearing cavities 754. As a result, relative rotation about the third rotational axis 1412 may occur between the minor roll shaft 750 and the main hub 706.

Figure 18:
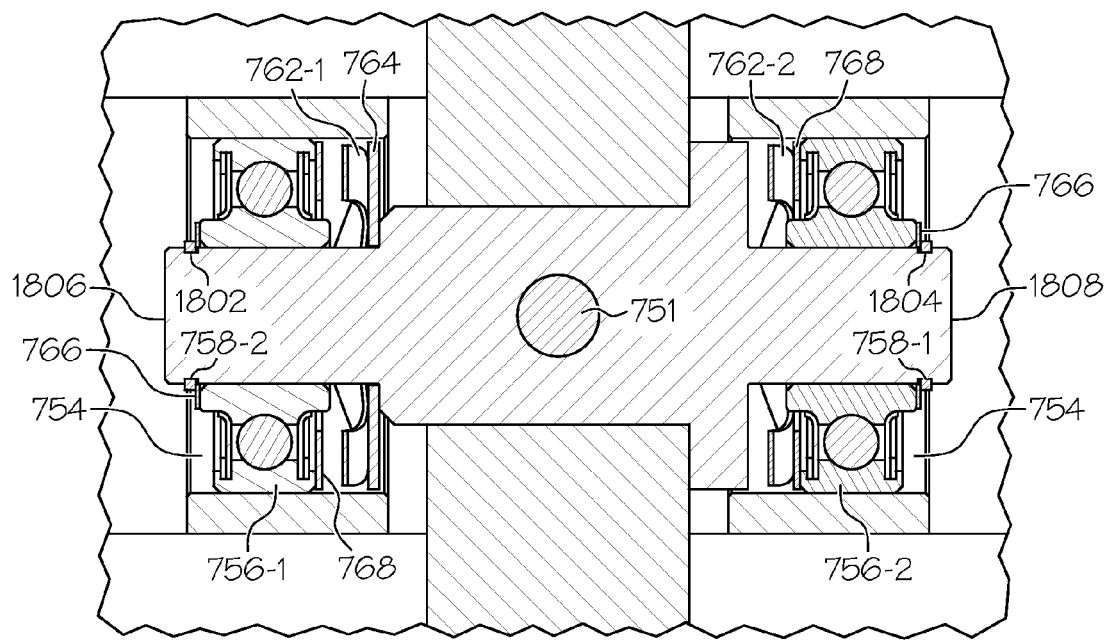
FIG. 18 is a detailed view of the portion of FIG. 17 encircled by 18.

The minor roll shaft bearings 756 are retained in position, in a free floating manner, similar to how each of the minor pitch shaft bearings 734 are retained in position. In particular, and with reference now to FIG. 18, a first groove 1802 and a second groove 1804 are formed in the minor roll shaft 750 adjacent a first end 1806 and a second end 1808, respectively, thereof. A first retaining ring 758-1 is disposed within the first groove 1802, and a second retaining ring 758-2 is disposed in the second groove 1804. A minor roll shaft bearing spring 762, which in the depicted embodiment is also implemented using a spring washer, is disposed within each main hub bearing cavity 754 between the main pitch shaft 710 and each of the minor roll shaft bearings 756. More specifically, because of the manner in which the minor roll shaft 750 is configured in the depicted embodiment, one of the minor roll shaft bearing springs 762-2 is disposed between a minor roll shaft bearing 756-2 and an annular retaining surface 1812 formed on the minor roll shaft 750, and the other minor roll shaft bearing spring 762-1 is disposed between the other minor roll shaft bearing 756-1 and a spring retaining shim 764 that is disposed over the minor roll shaft 750. Although a single minor roll shaft bearing spring 762 is disposed within each main hub bearing cavity 754, it will be appreciated that more than one minor roll shaft bearing spring 762 could be used, if needed or desired. Moreover, no matter the number of minor roll shaft bearing springs 762 that are used, each supplies a bias force to one of the minor roll shaft bearings 756 that pre-loads the minor roll shaft bearings 756 outwardly away from the main pitch shaft 710, in a free-floating manner. As FIG. 18 further depicts, one or more suitably sized shims 766, 768 may be disposed between each minor roll shaft bearing 756 and each minor roll shaft bearing spring 762 and/or each minor roll shaft retaining ring 758, as needed or desired.

In addition to each of the above-described components the gimbal assembly 104, at least in the depicted embodiment, additionally includes a control base 772, a user interface mounting post 774, and a rigging bracket 776. The control base 772 is coupled to the pitch hub 704 and is disposed over the pitch hub first bearing cavity 732-1. The control base 772 is additionally coupled to the user interface mounting post 774. In the depicted embodiment, as shown most clearly in FIGS. 8 and 9, a plurality of suitable fasteners 802 are used to couple the control base 772 to the pitch hub 704 and to couple the user interface mounting post 774 to the control base 772. The user interface 102, which is not depicted in any of FIGS. 7-21, is in turn coupled to the user interface mounting post 774 via, for example, a plurality of suitable, non-illustrated fasteners. The rigging bracket 776 is coupled to the pitch hub 704 generally opposite the control base 772, and is disposed over the pitch hub second bearing cavity 732-2. In the depicted embodiment the rigging bracket 776 is coupled to the pitch hub 704 via suitable, non-illustrated fasteners.

It was previously noted that the integral pitch stop surfaces 715 limit rotation of the pitch hub 704 and, concomitantly, the user interface 102, about the second rotational axis 113, and that the integral roll stop surfaces 746 limit rotation of the main hub 706 and, concomitantly, the user interface 102, about the first rotational axis 111. It was also noted above that this functionality would be described in more detail. This discussion will now be provided in conjunction with FIGS. 19-21.

Figure 19:
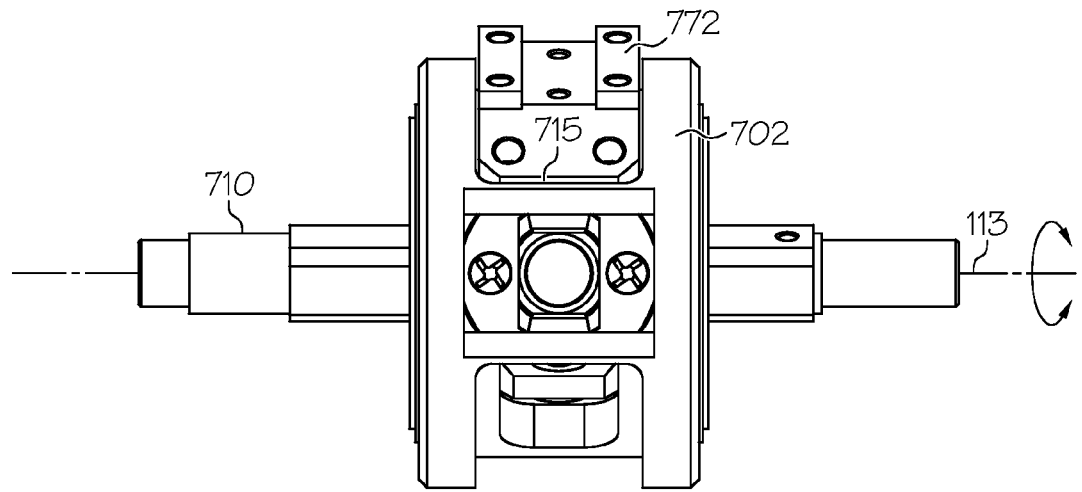
FIGS. 19 and 20 are end and side views, respectively, of the gimbal assembly illustrating the function of integral pitch stop surfaces.
Figure 20:
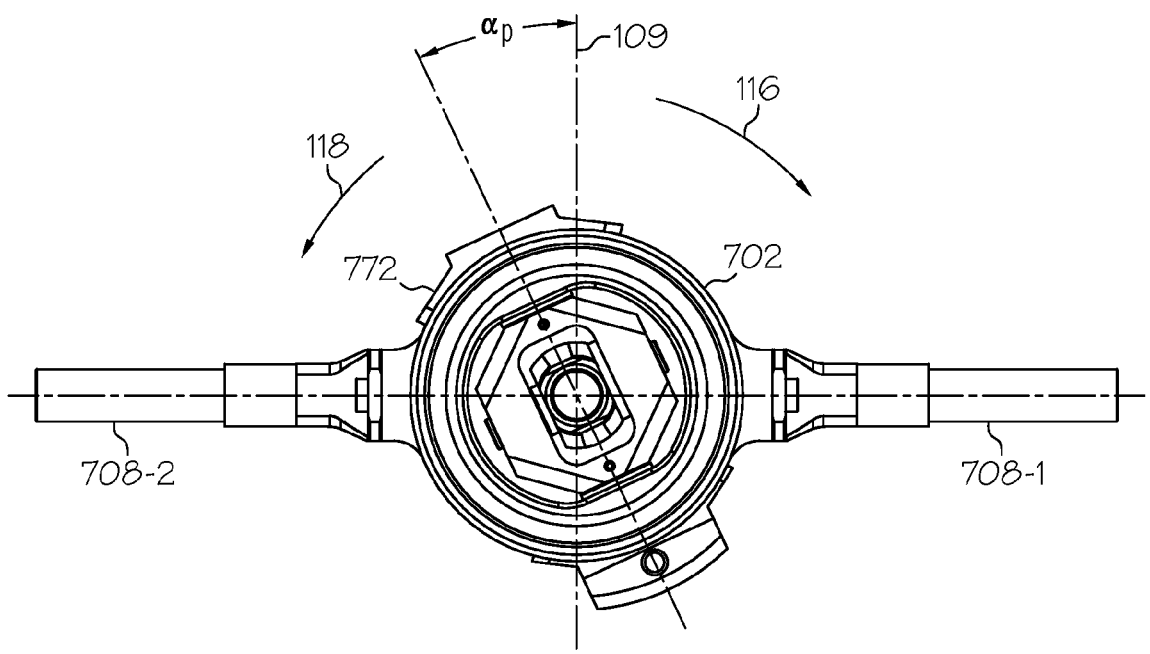
Figure 21:
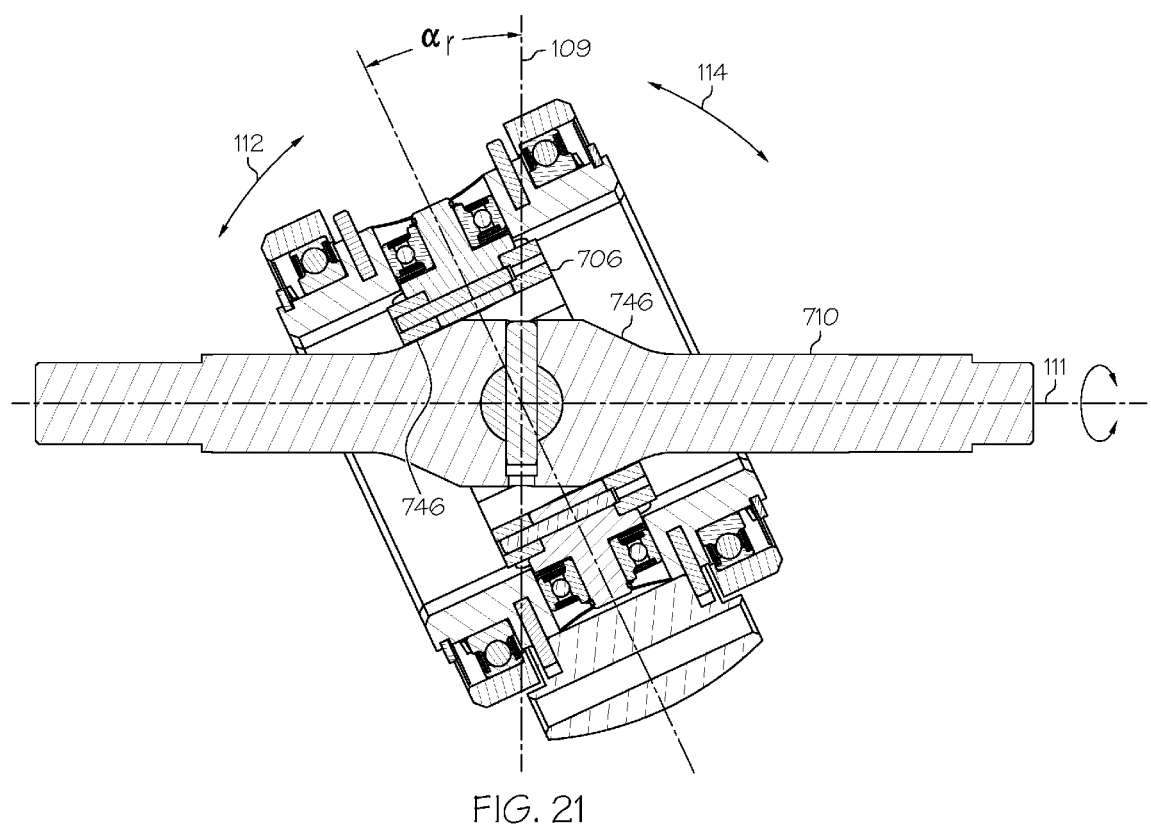
FIG. 21 is a cross section view of the gimbal assembly illustrating the function of integral roll stop surfaces.

Referring first to FIGS. 19 and 20, it may be seen that the integral pitch stop surfaces 715 engage the control base 772 when the pitch hub 704, in response to a force supplied to the non-illustrated user interface 102, is rotated a predetermined pitch angle ($\alpha_p$) relative to the null position 109, in either a forward or a backward direction 116, 118. It will be appreciated that the predetermined pitch angle ($\alpha_p$) may vary to meet desired specifications. In one particular embodiment, the predetermined pitch angle ($\alpha_p$) is 25-degrees. Referring now to FIG. 21, the integral roll stop surfaces 746 engage the main hub 706 when the main hub 706, in response to a force supplied to the non-illustrated user interface 102, is rotated a predetermined roll angle ($\alpha_r$) relative to the null position 109, in either a port or starboard direction 112, 114. It will be appreciated that the predetermined roll angle ($\alpha_r$) may also vary to meet desired specifications. In one particular embodiment, the predetermined roll angle ($\alpha_r$) is also 25-degrees.

Figure 23:
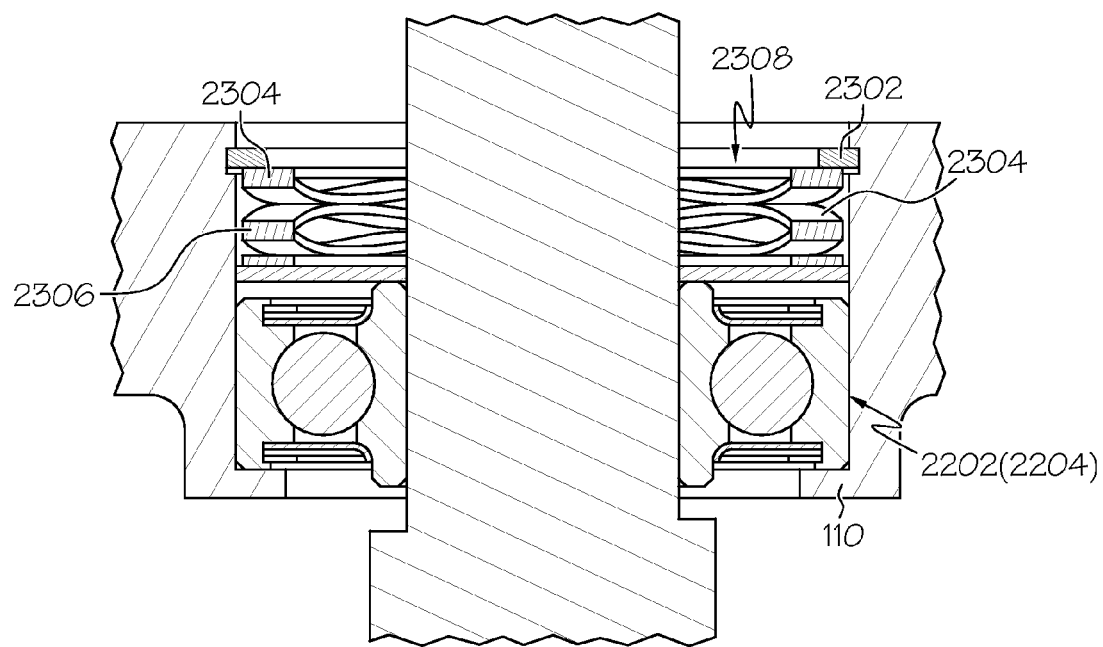
FIG. 23 is a detailed view of a portion of FIG. 22.

The gimbal assembly bearings, namely the pitch hub bearings 716, the minor pitch shaft bearings 734, and the minor roll shaft bearings 756, are all mounted, as described above, in a free floating manner. In addition, each of the main roll shaft bearings 2202 and each of the main pitch shaft bearings 2204 is mounted in a free floating manner. More specifically, and with reference now to FIG. 23, it is seen that a retaining ring 2302, a spring 2304, and one or more optional shims 2306, are used to mount the main roll shaft bearings and the main pitch shaft bearings 2202, 2204 in associated bearing cavities 2308 formed in the housing assembly 110.

The use of free floating bearings in the above-described gimbal assembly 104 and mounting arrangement provides a self-aligning assembly that eliminates the need for shimming for final assembly fits. That is, each bearing is free to self-align and self-adjust as the gimbal assembly 104 is assembled, mounted, and operated. This configuration, among other things, eliminates the need for relatively high accuracy positional tolerances that are normally needed to maintain bearing alignment and concentricity. This configuration additionally eliminates the need to use a mechanical adjustment method to set the bearing end play. As a result, component machining can be done more cost efficiently, and assembly time may be significantly reduced. Moreover, because this bearing configuration provides a relatively constant load on the bearings, minimal radial play is maintained throughout assembly lifetime, which can result in the bearings being less susceptible to wear.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. A gimbal assembly, comprising:
   a roll hub configured to rotate about a first rotational axis;
   a pitch hub disposed at least partially within the roll hub;
   a main hub disposed at least partially within, and coupled to, the pitch hub;
   a plurality of pitch hub bearings disposed between the roll hub and the pitch hub to allow the pitch hub to rotate relative to the roll hub about a second rotational axis that is perpendicular to the first rotational axis;
   a main pitch shaft coupled to, and extending through, the main hub along the second rotational axis;
   a first main roll shaft coupled to the roll hub and extending therefrom along the first rotational axis;

a second main roll shaft to the roll hub and extending therefrom along the first rotational axis;

a minor roll shaft coupled to, and extending through, the pitch shaft along the first rotational axis;

a plurality of minor roll shaft bearings mounted on the minor roll shaft and disposed between the minor roll shaft and the main hub to allow the minor roll shaft to rotate relative to the main hub about the first rotational axis;

a plurality of minor roll shaft bearing springs, each minor roll shaft bearing spring supplying a bias force to a minor roll shaft bearing that pre-loads that minor roll shaft bearing axially outwardly away from the minor roll shaft, whereby each minor roll shaft bearing is fully-floating, self-aligning, and self-adjusting; and a plurality of pitch hub bearing springs, each pitch hub bearing spring supplying a bias force to a pitch hub bearing that pre-loads that pitch hub bearing axially inwardly toward a section of the pitch hub, whereby each pitch bearing is fully-floating, self-aligning, and self-adjusting.

2. The assembly of claim 1, wherein:

each of the plurality of pitch hub bearings comprises an inner race, an outer race, and a plurality of bearing balls disposed between the inner and outer races;

the inner race is mounted on the pitch hub; and the outer race engages the roll hub.

3. The assembly of claim 2, further comprising:

a first groove formed in the pitch hub;

a second groove formed in the pitch hub;

a first retaining ring disposed in the first groove for retaining one of the plurality of pitch hub bearings between the roll hub and the pitch hub; and a second retaining ring disposed in the second groove for retaining another one of the plurality of pitch hub bearings between the roll hub and the pitch hub.

4. The assembly of claim 3, further comprising:

a plurality of shims, each shim disposed between one of the first or second retaining rings and one of the pitch hub bearing springs.

5. The assembly of claim 1, wherein the roll hub is configured to rotate about the first rotational axis between a null position and a plurality of control positions, and wherein the assembly further comprises:

integral roll stop surfaces formed on the main pitch shaft that engage the main hub when the main hub is rotated about the first axis a predetermined angle relative to the null position, to thereby limit rotation of the main hub about the first rotational axis.

6. The assembly of claim 1, wherein the minor roll shaft includes a first end and a second end, and wherein the assembly further comprises:

a first groove formed in the minor roll shaft adjacent the first end thereof;

a second groove formed in the minor roll shaft adjacent the second end thereof;

a first retaining ring disposed in the first groove for retaining one of the plurality of minor roll shaft bearings on the minor roll shaft;

a second retaining ring disposed in the second groove for retaining another one of the plurality of minor roll shaft bearings on the minor roll shaft.

7. The assembly of claim 6, further comprising:

a plurality of shims, each shim disposed between one of the first or second retaining rings and one of the minor roll shaft bearing springs.

8. The assembly of claim 1, further comprising:

a first minor pitch shaft coupled to the main hub and extending at least partially through the pitch hub along a third rotational axis, the third rotational axis perpendicular to the first and second rotation axes;

a second minor pitch shaft coupled to the main hub and extending at least partially through the pitch hub along the third rotational axis;

a first minor pitch shaft bearing mounted on the first minor pitch shaft and disposed between the first minor pitch shaft and the pitch hub to allow the first minor pitch shaft to rotate relative to the pitch hub about the third rotational axis;

a second minor pitch shaft bearing mounted on the second minor pitch shaft and disposed between the second minor pitch shaft and the pitch hub to allow the second minor pitch shaft to rotate relative to the pitch hub about the third rotational axis;

a first minor pitch shaft bearing spring supplying a bias force to the first minor pitch shaft bearing that pre-loads the first minor pitch shaft bearing axially outwardly away from first minor pitch shaft, whereby the first minor pitch shaft bearing is fully-floating, self-aligning, and self-adjusting; and a second minor pitch shaft bearing spring supplying a bias force to the second minor pitch shaft bearing that pre-loads the second minor pitch shaft bearing axially outwardly away from second minor pitch shaft, whereby the second minor pitch shaft bearing is fully-floating, self-aligning, and self-adjusting.

9. The assembly of claim 8, further comprising:

a groove formed in the first minor pitch shaft adjacent an end thereof;

a groove formed in the second minor pitch shaft adjacent an end thereof;

a first retaining ring disposed in the first minor pitch shaft groove for retaining the first minor pitch shaft bearing on the first minor pitch shaft;

a second retaining ring disposed in the second minor pitch shaft groove for retaining the second minor pitch shaft bearing on the second minor pitch shaft.

10. The assembly of claim 9, further comprising:

a plurality of shims, each shim disposed between one of the first or second retaining rings and one of the first or second minor pitch shaft bearing springs.

11. The assembly of claim 1, further comprising:

a housing on which the first and second main roll shafts, and the pitch shaft, are each rotationally mounted, the first and second main roll shafts rotational about the first rotational axis, the pitch shaft rotational about the second rotational axis.

12. The assembly of claim 11, further comprising:

a first main roll shaft bearing mounted on the first main roll shaft and disposed between the first main roll shaft and the housing to allow the first main roll shaft to rotate relative to the housing about the first rotational axis;

a first main roll shaft bearing spring supplying a bias force to the first main roll shaft bearing that pre-loads the first main roll shaft bearing axially inwardly toward the roll hub, whereby the first main roll shaft bearing is fully-floating, self-aligning, and self-adjusting;

a second main roll shaft bearing mounted on the second main roll shaft and disposed between the second main roll shaft and the housing to allow the second main roll shaft to rotate relative to the housing about the first rotational axis;

a second main roll shaft bearing spring supplying a bias force to the second main roll shaft bearing that pre-loads the second main roll shaft bearing axially inwardly toward the roll hub, whereby the second main roll shaft bearing is fully-floating, self-aligning, and self-adjusting;

first and second pitch shaft bearings mounted on the pitch shaft and disposed between the pitch shaft and the housing to allow the pitch shaft to rotate relative to the housing about the second rotational axis; and first and second pitch shaft bearing springs supplying a bias force to the first and second pitch shaft bearings, respectively, that pre-loads the first and second pitch shaft bearings axially inwardly toward the main hub, whereby the first and second pitch shaft bearings are fully-floating, self-aligning, and self-adjusting.

13. The assembly of claim 12 the pitch hub is configured to rotate about the second rotational axis between a null position and a plurality of control positions, and wherein the assembly further comprises:

a user interface coupled to the pitch hub and configured to receive an input force from a user; and integral pitch stop surfaces formed on the roll hub that engage the user interface when, in response to a force supplied to the user interface, the pitch hub and user interface are rotated about the second axis a predetermined pitch angle relative to the null position, to thereby limit rotation of the pitch hub about the second rotational axis.

14. A user interface assembly, comprising:

a user interface;

a roll hub configured to rotate, from a null position to a plurality of control positions, about a first rotational axis;

a first main roll shaft coupled to the roll hub and extending therefrom along the first rotational axis;

a second main roll shaft to the roll hub and extending therefrom along the first rotational axis;

a pitch hub disposed at least partially within the main roll hub and coupled to the user interface;

a plurality of pitch hub bearings disposed between the roll hub and the pitch hub to allow the pitch hub to rotate relative to the roll hub, from the null position to a plurality of control positions, about a second rotational axis that is perpendicular to the first rotational axis;

a plurality of pitch hub bearing springs, each pitch hub bearing spring supplying a bias force to a pitch hub bearing that pre-loads that pitch hub bearing axially inwardly toward a section of the pitch hub, whereby each pitch hub bearing is fully-floating, self-aligning, and self-adjusting;

a main hub disposed at least partially within, and coupled to, the pitch hub; and a main pitch shaft coupled to, and extending through, the main hub along the second rotational axis;

integral roll stop surfaces formed on the main pitch shaft that engage the main hub when the main hub is rotated about the first axis a predetermined angle relative to the null position, to thereby limit rotation of the main hub about the first rotational axis; and integral pitch stop surfaces formed on the roll hub that engage the user interface when, in response to a force supplied to the user interface, the pitch hub and user interface are rotated about the second axis a predetermined pitch angle relative to the null position, to thereby limit rotation of the roll hub about the second rotational axis.

15. The assembly of claim 14, further comprising:

a first minor pitch shaft coupled to the main hub and extending at least partially through the pitch hub along a third rotational axis, the third rotational axis perpendicular to the first and second rotation axes;

a second minor pitch shaft coupled to the main hub and extending at least partially through the pitch hub along the third rotational axis;

a first minor pitch shaft bearing mounted on the first minor pitch shaft and disposed between the first minor pitch shaft and the pitch hub to allow the first minor pitch shaft to rotate relative to the pitch hub about the third rotational axis;

a second minor pitch shaft bearing mounted on the second minor pitch shaft and disposed between the second minor pitch shaft and the pitch hub to allow the second minor pitch shaft to rotate relative to the pitch hub about the third rotational axis;

a first minor pitch shaft bearing spring supplying a bias force to the first minor pitch shaft bearing that pre-loads the first minor pitch shaft bearing axially outwardly away from first minor pitch shaft, whereby the first minor pitch shaft bearing is fully-floating, self-aligning, and self-adjusting; and a second minor pitch shaft bearing spring supplying a bias force to the second minor pitch shaft bearing that pre-loads the second minor pitch shaft bearing axially outwardly away from second minor pitch shaft, whereby the second minor pitch shaft bearing is fully-floating, self-aligning, and self-adjusting.

16. The assembly of 15, further comprising:

a minor roll shaft coupled to, and extending through, the pitch shaft along the first rotational axis;

a plurality of minor roll shaft bearings mounted on the minor roll shaft and disposed between the minor roll shaft and the main hub to allow the minor roll shaft to rotate relative to the main hub about the first rotational axis; and a plurality of minor roll shaft bearing springs, each minor roll shaft bearing spring supplying a bias force to a minor roll shaft bearing that pre-loads that minor roll shaft bearing axially outwardly away from the minor roll shaft, whereby the minor roll shaft bearings are fully-floating, self-aligning, and self-adjusting.

* * * * *

UNITED STATES PATENT AND TRADEMARK OFFICE
CERTIFICATE OF CORRECTION

| | |
|---|---|
| PATENT NO. | : 8,033,197 B2 |
| APPLICATION NO. | : 11/872571 |
| DATED | : October 11, 2011 |
| INVENTOR(S) | : Larson et al. |

It is certified that error appears in the above-identified patent and that said Letters Patent is hereby corrected as shown below:

Column 11, line 41, "the main roll" should be changed to --the roll--.

Signed and Sealed this
Tenth Day of April, 2012

David J. Kappos
*Director of the United States Patent and Trademark Office*